J. H. REINHARDT.
BOTTLE FILLING MACHINE.
APPLICATION FILED OCT. 6, 1911.
1,048,881.
Patented Dec. 31, 1912.
3 SHEETS—SHEET 3.
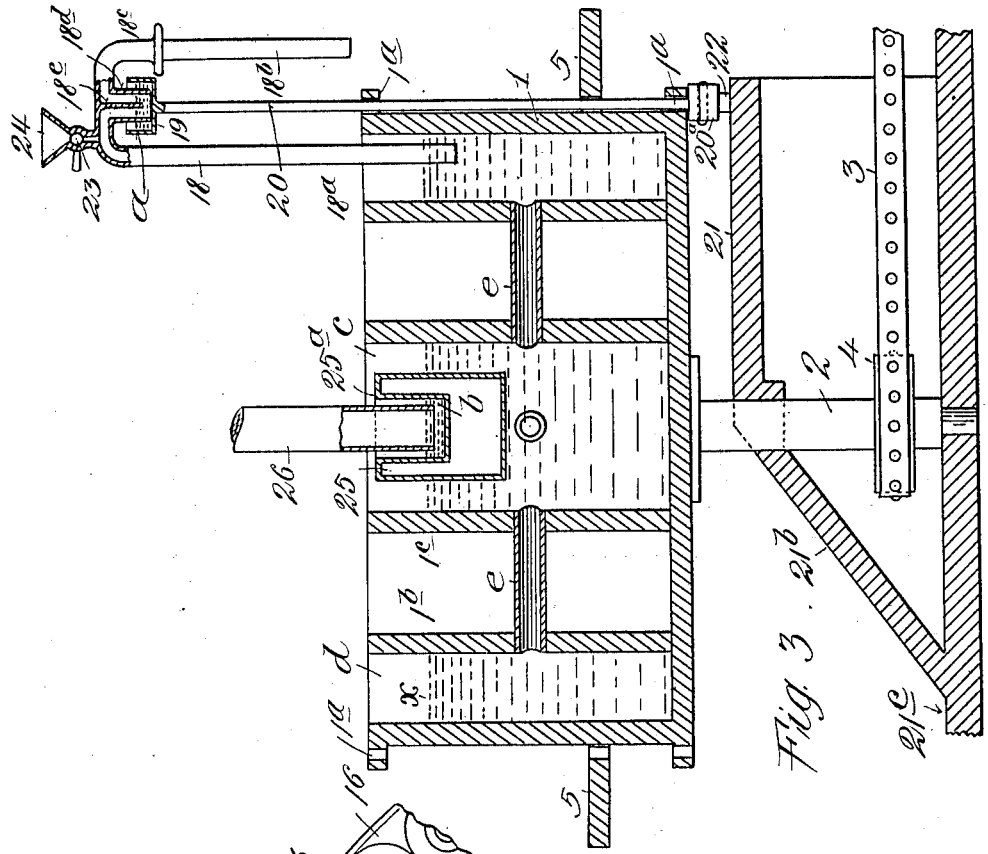
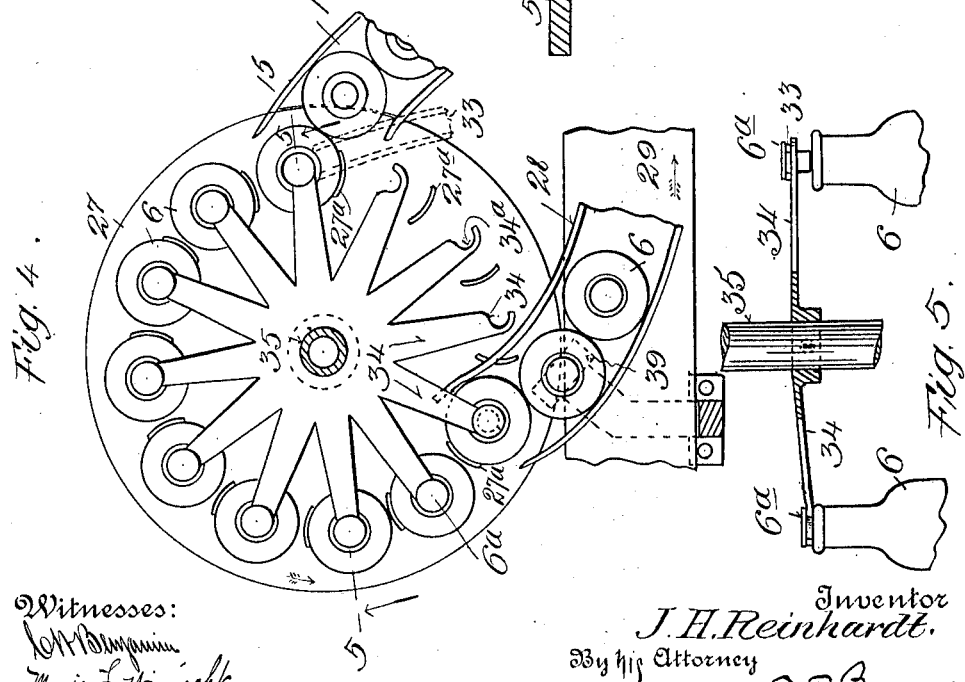
Witnesses:
Inventor
J. H. Reinhardt.
By his Attorney
T. F. Bourne

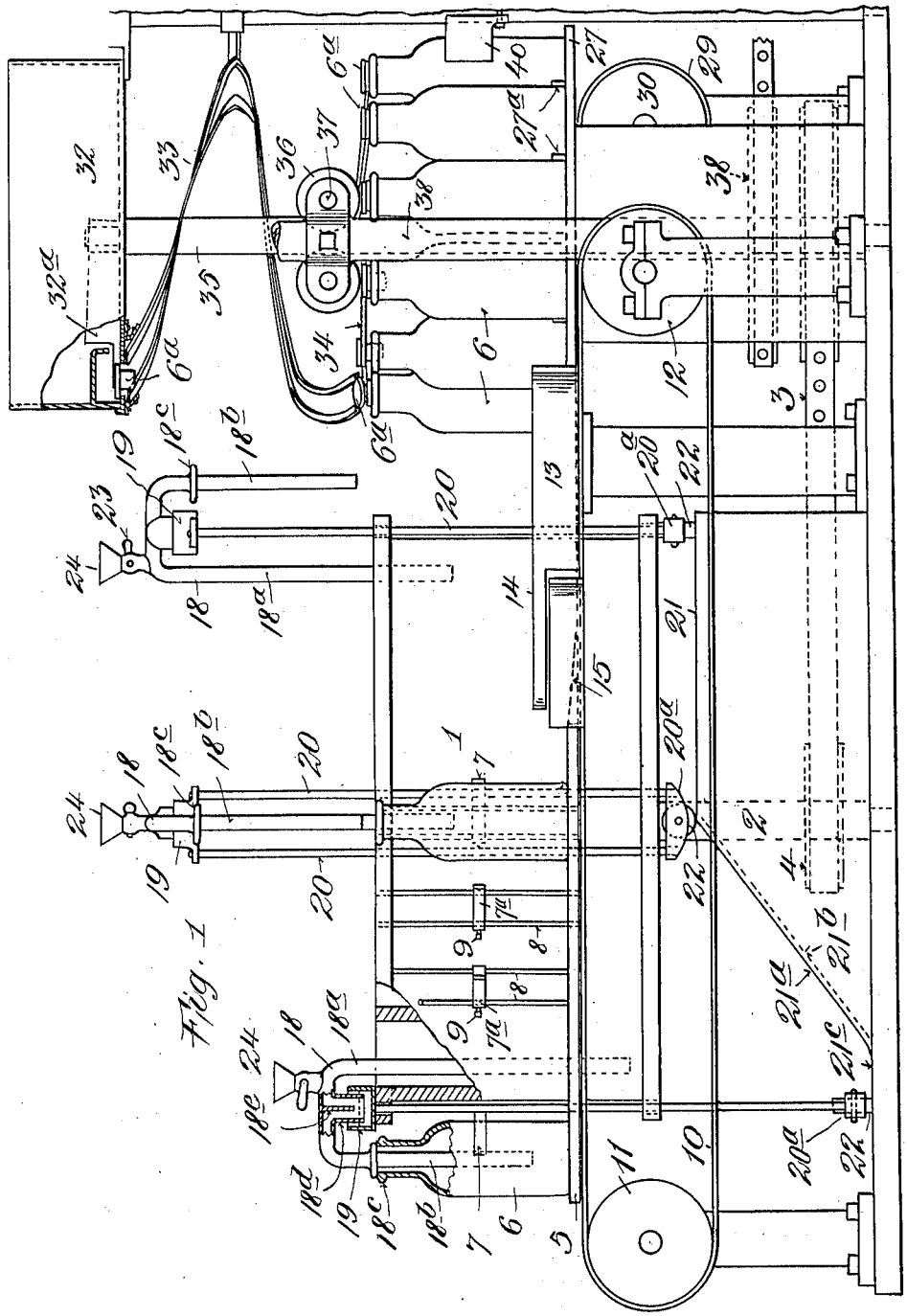

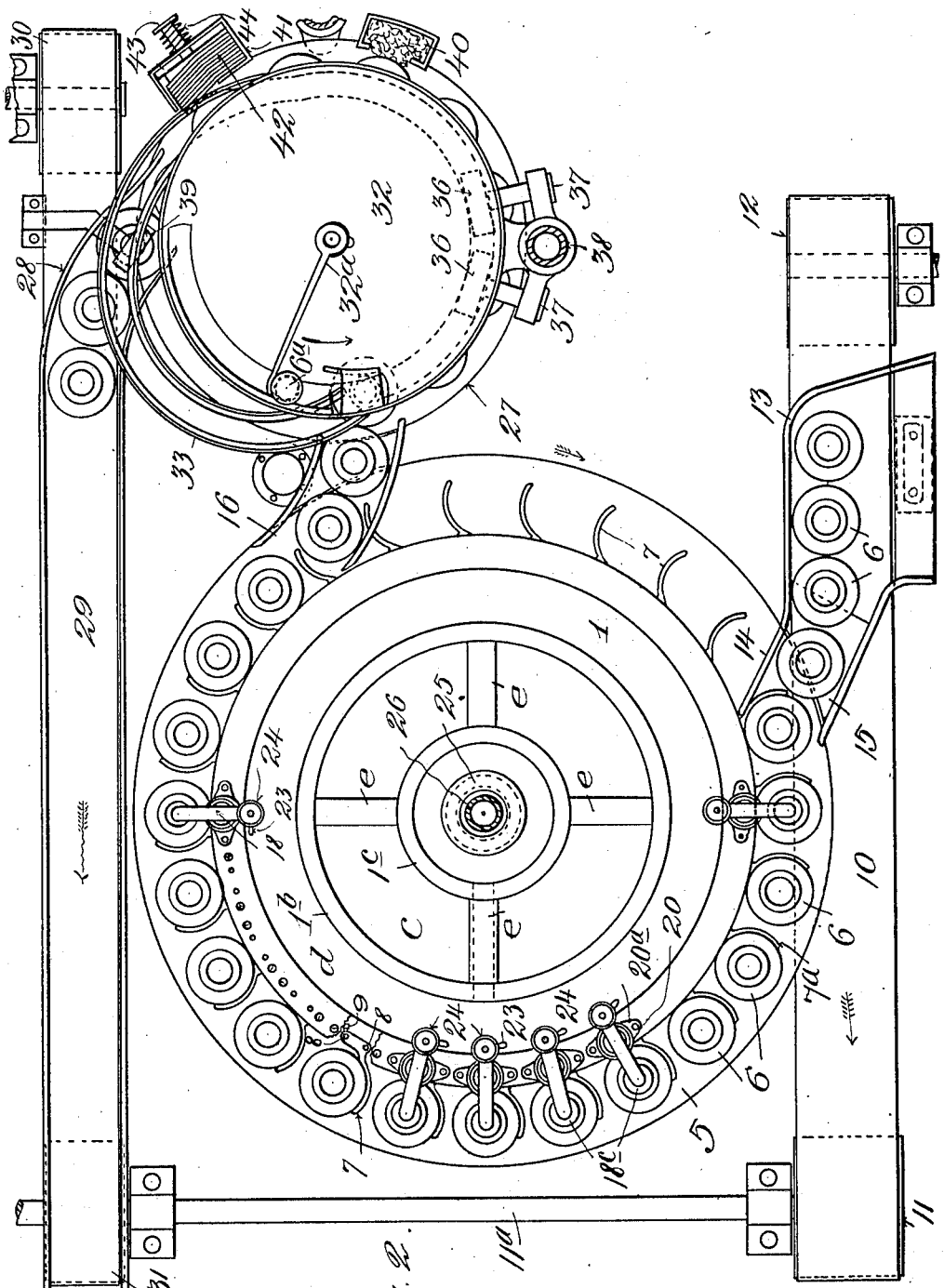

UNITED STATES PATENT OFFICE.

JAMES H. REINHARDT, OF EAST ORANGE, NEW JERSEY.

BOTTLE-FILLING MACHINE.

1,048,881.  Specification of Letters Patent.  Patented Dec. 31, 1912.

Application filed October 6, 1911. Serial No. 653,089.

*To all whom it may concern:*

Be it known that I, JAMES H. REINHARDT, a citizen of the United States, and resident of East Orange, in the county of Essex and State of New Jersey, have invented certain new and useful Improvements in Bottle-Filling Machines, of which the following is a specification.

The object of my invention is to provide improved means for causing the flow of liquid, as desired, the invention having particular adaptability for filling bottles and for automatically stopping the flow of the liquid into the bottles upon the latter being filled to a sufficient or predetermined height.

My invention is particularly adapted to fill bottles successively while they are in transit.

In carrying out my invention I provide a siphon-tube one leg of which is adapted to enter a tank or receptacle that contains a desired liquid to a substantially predetermined height, the other leg of said siphon tube being adapted for the discharge of liquid, and to enter a bottle to a suitable depth, and in connection with the siphon-tube I provide a trap adapted to permit the flow of liquid through the siphon tube when a member of the trap is in one position, and to check the flow of liquid through the siphon tube when such member is in another position, and at the latter time to prevent breaking of the siphon and retain the siphon tube charged with liquid.

My invention further comprises novel details of improvement and combinations of parts that will be more fully hereinafter set forth and then pointed out in the claims.

Reference is to be had to the accompanying drawings forming part hereof, wherein, Figure 1 is a partly sectional side elevation of a bottle filling and corking machine embodying my invention; Fig. 2 is a plan view thereof; Fig. 3 is a central section of the liquid tank and other parts; Fig. 4 is a plan view of the bottle corking devices, part being removed, and Fig. 5 is a detail section on the line 5, 5, in Fig. 4.

Similar numerals of reference indicate corresponding parts in the several views.

In the drawings the numeral 1 indicates a rotative tank or receptacle to contain a desired liquid, said tank being shown supported upon an upright shaft 2 suitably journaled and which may be rotated in any desired manner, as by belt and pulley 3, 4. Tank 1 is shown provided with an outwardly disposed shelf or support 5 upon which the bottles 6 rest said shelf being attached to and carried by the tank. Tank 1 is provided with suitable means for retaining the bottles upon shelf 5 as the shelf rotates. The means I have shown comprises fingers 7 disposed outwardly from tank 1 adapted to engage the sides of the bottles, which fingers may be secured to the tank in any suitable manner. I have shown fingers 7 as vertically adjustable to properly engage bottles of different heights. To this end tank 1 is provided with one or more rods 8 upon which the foot $7^a$ of the corresponding finger 7 is slidably mounted, and said foot is shown provided with set screw 9 for holding the foot in desired adjusted position upon the rods. By having two rods 8 suitably spaced passing through holes in the same foot $7^a$ the latter is kept in proper position and from rotating. The bottles may be deposited upon shelf 5 in any suitable manner. For this purpose I have shown an endless belt 10 passing over pulleys 11, 12 which may be operated in suitable manner, the upper run of said belt passing directly beneath shelf 5. Over the belt, at one side of shelf 5, is a suitable chute or guide 13, having an outlet or guideway 14 disposed over shelf 5 and provided with an inclined way or base 15 leading to the edge of shelf 5, so that when bottles are placed in chute 13 upon belt 10 and are carried along by the latter they will slide up on the way 15, pushing one another, and be deposited upon shelf 5 and the corresponding finger 7 will engage the side of the adjacent bottle and retain it on the shelf, as the latter rotates with tank 1. Suitably disposed over shelf 5, at a distance from outlet or guideway 14, is a receiving guideway or chute 16, the inner end of which extends over shelf 5 to receive bottles from the latter. The devices above described provide convenient means for temporarily maintaining the bottles adjacent the rotative tank 1 to be carried around with the latter from the receiving to the discharging guideway, during which time the bottles are filled.

The means I have shown for automatically filling the bottles to the desired height are as follows: At 18 are siphon tubes, each shown having long legs $18^a$ and shorter legs $18^b$, the legs $18^a$ being adapted to enter the liquid in tank 1, and the shorter legs 18^b extending over tank 1 and being adapted to enter the bottles. The legs 18^b are shown provided with flanges or projections 18^c adapted to rest upon the bottle necks. The siphon tubes 18 are provided with traps, shown comprising the tube 18^d communicating at the upper end with the siphon tube, and open at the lower end, and an intermediate wall 18^e terminating above the bottom of tube 18^d, the tube 18^d and wall 18^e being adapted to enter a cup or receptacle 19 containing mercury or other suitable sealing fluid, into which the parts 18^d and 18^e are adapted to dip. When the siphon tube 18 is supported by cup 19, as in Fig. 3, and the lower end of leg 18^a enters the liquid in tank 1, the flow through the siphon tube will be cut off and the siphon maintained, but when the siphon tube 18 is lowered and its flanges 18^c rest upon the bottle neck, the cup 19 will be lowered sufficiently to permit the lower end of wall 18^e to rise from the mercury $a$, while the lower end of tube 18^d remains sealed by the mercury, whereby the liquid from tank 1 may flow through the siphon tube into the bottle. I have shown means for raising and lowering cup 19 at the required times, thereby raising and lowering siphon tube 18 to seal and unseal the same at the tube 18^d. For this purpose the tube 19 is supported by one or more rods 20 that are shown guided in openings 1^a in tank 1, (Fig. 3) whereby rods 20 may reciprocate and will be carried around by and with tank 1. Reciprocating movement may be imparted to rods 20 by any suitable means. For this purpose a circular track 21 is shown located beneath rods 20 and extends partly around and concentric with the axis of tank 1, track 21 being provided with downwardly inclined edges 21^a and 21^b at suitable distances apart that lead to the lower annular track or way 21^c. The lower ends of rods 20 are provided with rollers 22 adapted to ride upon said tracks or ways. The arrangement is such that, as tank 1 rotates, the rollers 22 will ride off the edge of track 21 down the incline 21^a to the lower track or way 21^c, during which time the short leg 18^b of the siphon will enter the bottle beneath the same, and the parts are so proportioned that when the flange 18^c rests upon the bottle, the cup 19 will have descended sufficiently to cause the mercury to unseal the lower end of wall 18^e while retaining the seal at the lower end of tube 18^d, (as at the left in Fig. 1), the roller 22 then being upon track or way 21^c. This unsealing of the wall 18^e permits the immediate outflow or siphoning of liquid from tank 1 through the siphon tube into the bottle, and the height of liquid in the bottle is determined by maintaining the level $x$ of the liquid in tank 1 at the desired height, so that as soon as the bottle is filled to such level $x$ no more liquid will flow into the bottle, and the action of filling the bottle to the desired level thus will be automatic. During such filling of the bottle the tank will be rotated, and after the bottle is filled the corresponding roller 22 will engage the inclined way or track 21^b and travel up the same. The first upward movement of rods 20 will lift mercury cup 19 and cause sealing of the siphon tube by reason of the mercury rising above the lower edge of wall 18^e, and the continued rise of rods 20 and the mercury cup 19 causes the latter to engage the bottom of tube 18^d and raise such parts and the siphon tube 18 until the roller 22 rides up on track or way 21, whereupon the leg 18^b of the siphon tube will have been raised out of the bottle. The siphon tube will now remain filled with liquid ready to charge a bottle on the next descent of the siphon tube. The siphon tubes may be charged by means of the valve 23 and funnel-like opening 24 communicating with the upper part of the siphon tube, when the siphon tube is first lowered into the bottle, and thereafter, during the filling of the bottles, the operation will be automatic.

While I have shown, in Fig. 2, a few of the siphon tubes arranged around tank 1, it will be understood that any desired number of the siphon tubes may be fitted to the tank, and that my improved siphon tubes may be used and operated singly or in series as may be desired. In the arrangement illustrated a siphon tube may be located with respect to each or any of the fingers 7, so that when a bottle is on shelf 5 and is engaged by such finger the short leg 18^b of the siphon tubes will be in proper position to enter the bottle neck. I have illustrated two rods 20 for each siphon tube, the upper ends of the rods being connected with cups 19, and the lower ends of rods 20 connected with blocks 20^a to which the rollers 22 are pivoted, whereby the siphon tubes are maintained in proper reciprocative relations.

The level $x$ of the liquid in tank 1 may be maintained in any suitable manner, so that a proper supply for all the bottles being filled will be automatically provided. For this purpose I have shown a float 25 in tank 1 provided with an inner compartment 25^a open at the top to receive the lower end of supply pipe 26, the compartment 25^a being charged with mercury $b$ to such height with respect to the full level of float 25 as to seal the lower end of supply pipe 26 when the liquid level is approximately at the desired height $x$, and when such level descends so that the float 25 causes the mercury to unseal the lower end of pipe 26 the liquid will flow into compartment 25 and spill over the latter into tank 1, and then when float 25 rises by the raising of the level $x$ of the liquid to the required height, pipe 26 will be sealed to prevent the inflow of liquid, and so on. This arrangement for controlling the height of liquid in tank 1 affords an accurate and quick stop to the inflowing of liquid through pipe 26 into the tank, to avoid danger of the liquid level rising too high in the tank with consequent overcharging the bottles by the siphonic action of the siphon tubes 18. It will be understood, however, that other wellknown means for maintaining a desired liquid level in the tank may be provided if desired, but by the means shown cutting off the supply into the rotating tank is not interfered with by the rotation of the tank, since float 25 may rotate freely with the tank, since pipe 26 freely enters compartment 25ª. While tank 1 may be of any suitable construction, I have shown the same provided with several communicating compartments, which will enable a relatively large tank to be used containing a relatively small supply of liquid, since, with some liquids, it will be desirable not to expose them too much to the influence of the atmospheric air. To this end I have shown tank 1 provided with concentric walls 1ᵇ, 1ᶜ, providing annular liquid spaces c, d, in communication by means of tubes e.

In connection with the continuous bottle filling devices before set forth, I provide means for applying corks to the bottles as they are delivered through chute 16 from shelf 5. For this purpose I provide a rotary table 27 whose edge rides under or adjacent to the delivery end of chute 16, which table is provided with suitably spaced fingers or stops 27ª to engage the bottles to carry them around on table 27 as the bottles are received from chute 16. At 28 is a receiving way for the bottles to be delivered from table 27, one end of which way 28 is shown projecting over table 27 at a suitable distance from chute 16, the other end of way 28 projecting over an endless belt 29 carried by pulleys 30, 31, suitably driven at the speed of belt 10 and in the same direction, pulley 31 being shown carried by shaft 11ª that carries pulley 11. Above table 27 is a hopper 32 adapted to contain corks 6ª for the bottles 6, and from the bottom of hopper 32 extends a chute 33 adapted to conduct the corks to a point over the necks of the bottles as they rest momentarily under chute 33 as delivered from way 16. At 34 are cork-engaging members carried by shaft 35 extending upwardly from table 27, the member 34 being adapted to pass under the lower end of chute 33 and being so located as to sweep the corks from the lower end of chute 33, and by their hook-like ends 34ª to retain the corks over the bottle necks one by one, respectively, when the latter are upon table 27. At a short distance from the lower end of chute 33 one or more rollers 36 are supported, as by shafts or pivots 37 carried by post 38, suitably supported as from the base of the machine, whereby as the bottles 6 with the corks over them are carried around table 27, the rollers 36 will engage said corks and push them partially into the bottles. At a point over chute 28, where the bottles have passed away from beneath the members 34, are rollers 39 (Figs. 2 and 4), adapted to engage the corks as the bottles are pushed by each other from table 27 into chute 28, to finally seat the corks in the bottle necks.

At 40 is a sponge or moistening device adapted to engage the edges of the bottles as they are carried around by table 27 to moisten them or to apply gum or paste thereto, and at 41 is a holder for labels 42, located at a suitable distance, in the direction of travel of the bottles, beyond sponge 40, and shown provided with a plunger 43 pressed by spring 44 against the labels, the free ends of the labels being in position to engage the gummed or moistened parts of the bottles, whereby as the bottles are carried along by table 27 the labels will be applied to the bottles. Over the bottom of chute 32 is a cork agitator 32ª carried by shaft 35 adapted to sweep the corks from hopper 32 into chute 33.

It will thus be understood that in accordance with my invention bottles may be filled in consecutive order by applying them upon shelf 5, and that the filling of the bottles will be automatic by reason of the rise and fall of the siphon tubes 18, so that the operator is not required to open or close valves to start or stop the flow of liquid to the bottles.

While I have illustrated and described a practical embodiment of my invention, it will be understood that changes may be made in the details of construction and arrangements set forth, within the scope of the appended claims, without departing from the spirit of the invention.

Having now described my invention what I claim is:—

1. The combination of a rotative tank, with a siphon tube having a leg without the tank and a leg adapted to enter the tank, means guided upon and rotative with the tank to support said siphon tube, and means to raise the siphon tube and simultaneously cut off the flow of liquid through said tube and to permit the flow of liquid through the tube when said supporting means and tube are lowered.

2. The combination of a rotative tank, with a siphon tube having a leg adapted to enter the tank and a leg extending without the tank, a bottle supporting shelf carried by the tank below the last named leg, means guided upon and rotative with the tank to support said tube, means to raise and lower the tube support and the tube with respect to the tank, and means to cut off the flow of liquid through the tube when the latter is raised by the first named means and to permit the flow of liquid through the tube when the latter and its operating means are lowered.

3. The combination of a tank, with a siphon tube having a leg adapted to enter the tank, said tube having a side tube between its ends and a wall adjacent said side tube, with means movable relatively to said side tube and wall to seal and unseal said wall.

4. The combination of a tank, with a siphon tube having a leg adapted to enter the tank, said tube having a side tube between its ends and a wall adjacent said side tube, and a cup beneath and receiving said side tube and containing a fluid to seal and unseal said wall when said cup is raised and lowered.

5. The combination of a tank, with a siphon tube having a leg adapted to enter the tank and a leg without the tank, the siphon tube being provided with a side tube having an open end and a wall within said tube, and means to seal and unseal said wall while maintaining the outer end of the tube sealed.

6. The combination of a tank, with a siphon tube having a leg adapted to enter the tank and a leg without the tank, and having a side tube open at one end and in communication with the siphon tube, and a wall within said side tube, and a cup receiving said side tube and wall and containing fluid sealing the open end of the tube and adapted to seal and unseal said wall.

7. The combination of a tank, with a siphon tube having a leg adapted to enter the tank and a leg without the tank, said siphon tube having a side tube communicating therewith between its ends and provided with an open lower end, and a wall within the siphon tube entering the side tube and terminating above the open end of the latter, and a cup receiving the side tube, said cup containing mercury sealing the open end of the side tube and adapted to seal and unseal the wall.

8. The combination of a tank, a siphon tube having a leg adapted to enter the tank and a leg without the tank, means to rotate the tank, a seal for the siphon tube between the ends of its legs, and means to shift the siphon tube to operate the seal by and during rotation of the tank.

9. The combination of a tank, means to rotatively support the same, a siphon tube having a leg entering the tank and a leg without the tank, the siphon tube being provided with a side tube having its lower end open, a wall entering the side tube and terminating above the lower end of the latter, a cup receiving the side tube and wall and provided with sealing fluid for the tube and wall, and means to cause the cup to rise and fall during rotation of said tank.

10. The combination of a tank, means to rotatively support the same, a siphon tube having a leg entering the tank and a leg without the tank, the siphon tube being provided with a side tube having its lower end open, and a wall entering the side tube and terminating above the lower end of the latter, a cup receiving the side tube and wall and provided with sealing fluid for the tube and wall, a track having portions at different elevations connected by inclined portions, and a rod depending from the cup to travel along the track to raise and lower the cup and siphon tube.

11. The combination of a tank, means to rotatively support the tank, a siphon tube having a leg adapted to enter the tank and a leg without the tank and provided with sealing means, between the ends of the siphon legs, a rod depending from the sealing means, and means to reciprocate the rod during rotation of the tank.

12. The combination of a tank, means to rotatively support the tank, a siphon tube having a leg adapted to enter the tank and a leg without the tank and provided with sealing means, a rod depending from the sealing means, a track having portions on different levels connected by intermediate portions, and a rod connected with the sealing means to travel along the said track to raise and lower the siphon tube and its sealing means.

13. The combination of a rotative tank provided with an outwardly disposed shelf, a siphon tube having a leg adapted to enter the tank and a leg depending over the shelf, said siphon tube having a depending side tube open at one end and a wall within said side tube, a cup receiving the side tube and wall and provided with a sealing fluid for the tube and wall, and means to raise and lower the cup and siphon tube.

14. The combination of a rotative tank provided with an outwardly disposed shelf, a siphon tube having a leg adapted to enter the tank and a leg depending over the shelf, said siphon tube having a depending side tube open at one end and a wall within said side tube, a cup receiving the side tube and wall and provided with a sealing fluid for the tube and wall, and means to raise and lower the cup and siphon tube, said means providing limited independent movement of the cup relatively to the side tube.

15. The combination of a rotative tank provided with an outwardly disposed shelf, a siphon tube having a leg adapted to enter the tank and a leg depending over the shelf, said siphon tube having a depending side tube open at one end and a wall within said side tube, a cup receiving the side tube and wall and provided with a sealing fluid for the tube and wall, and means to raise and lower the cup and siphon tube, said cup being provided with a depending rod, and a track having portions on different levels connected by inclined portions to coact with said rod to raise and lower the latter and the siphon tube and its seal.

16. A siphon tube having a pair of depending legs and a side tube extending therefrom between the ends of the siphon tube, the side tube having its outer end open and a wall within the side tube, and a cup receiving the open end of the side tube, and containing sealing fluid for the side tube and wall, and means to move said cup and tube with respect to one another to seal and unseal the wall.

17. A siphon tube having a plurality of downwardly disposed legs and a transverse portion provided with a side tube having its lower end open, a wall extending across the siphon tube at its transverse portion and entering the side tube, the lower end of the wall providing communication through the side tube between the legs of the siphon tube, a cup receiving the side tube and containing sealing fluid for the latter and said wall, and means for moving the cup and side tube with respect to one another to seal and unseal said wall.

18. A siphon tube having a plurality of downwardly disposed legs and a transverse portion provided with a side tube having its lower end open, a wall extending across the siphon tube at its transverse portion and entering the side tube, the lower end of the wall providing communication through the side tube between the legs of the siphon tube, a cup receiving the side tube and containing sealing fluid for the latter and said wall, and means for moving the cup and side tube with respect to one another to seal and unseal said wall, one of the legs of the siphon tube being provided with a projection to support said siphon tube when it is lowered.

Signed at New York city, in the county of New York, and State of New York, this 4th day of October, A. D. 1911.

JAMES H. REINHARDT.

Witnesses:
  MAX M. KOTZEN,
  T. F. BOURNE.

Copies of this patent may be obtained for five cents each, by addressing the "Commissioner of Patents, Washington, D. C."